US005769467A

United States Patent [19]
Bridges

[11] Patent Number: 5,769,467
[45] Date of Patent: Jun. 23, 1998

[54] PIPE COUPLINGS FOR MISALIGNED OR OUT-OF-ROUND PIPES AND EXPANDING/ CONTRACTING PIPES

[76] Inventor: Donald Y. Bridges, 3014 Creek Ct., Roswell, Ga. 30075

[21] Appl. No.: 837,164

[22] Filed: Apr. 14, 1997

Related U.S. Application Data

[62] Division of Ser. No. 541,491, Oct. 10, 1995, abandoned.

[51] Int. Cl.⁶ .................................................. F16L 17/04
[52] U.S. Cl. ...................... 285/370; 285/373; 285/906; 285/416; 29/434
[58] Field of Search .................................. 285/373, 419, 285/416, 237, 370, 371, 397, 398, 258, 906; 29/434

[56] References Cited

U.S. PATENT DOCUMENTS

| | | | |
|---|---|---|---|
| 2,041,132 | 5/1936 | Johnson | 285/194 |
| 3,776,579 | 12/1973 | Gale | 285/233 |
| 3,877,733 | 4/1975 | Straub | 285/105 |
| 4,360,227 | 11/1982 | Bridges | 285/373 |
| 4,421,347 | 12/1983 | Kantor | 285/369 |
| 4,664,428 | 5/1987 | Bridges | 285/373 |
| 4,702,500 | 10/1987 | Thau, Jr. et al. | 285/112 |
| 4,726,611 | 2/1988 | Sauer | 285/373 X |
| 4,807,912 | 2/1989 | Maier | 285/348 |
| 4,842,306 | 6/1989 | Zeidler et al. | 285/373 X |
| 4,927,189 | 5/1990 | Burkit | 285/109 |
| 5,076,618 | 12/1991 | Bridges | 285/370 |
| 5,086,809 | 2/1992 | Bridges | 138/99 |
| 5,092,633 | 3/1992 | Burkit | 285/109 |
| 5,161,836 | 11/1992 | McKinnon | 285/373 |
| 5,203,594 | 4/1993 | Straub | 285/373 X |
| 5,230,537 | 7/1993 | Newman | 285/112 |
| 5,249,829 | 10/1993 | Hendrickson | 285/112 |
| 5,280,969 | 1/1994 | Straub | 285/105 |
| 5,286,064 | 2/1994 | Bridges | 285/15 |
| 5,295,716 | 3/1994 | Bridges | 285/15 |
| 5,362,107 | 11/1994 | Bridges | 285/15 |
| 5,383,496 | 1/1995 | Bridges et al. | 138/99 |

FOREIGN PATENT DOCUMENTS

| | | | |
|---|---|---|---|
| 288993 | 11/1988 | European Pat. Off. | 285/373 |

*Primary Examiner*—Dave W. Arola
*Attorney, Agent, or Firm*—Jones & Askew

[57] ABSTRACT

A pipe coupling for sealing a joint between pipes in a pipeline by compressing annular gasket members against the pipes around the joint, the pipe coupling comprising an annular coupling member having end members and spaced annular protrusions forming gasket channels between the annular protrusions and respective end members for receiving the annular gasket members and a central channel between the gasket channels for accommodating some offset, deflection, or out-of-roundness in the pipes. In one embodiment, the coupling further comprises an outer set of annular protrusions for forming expansion channels outside of the gasket channels. The expansion channels allow retaining rings fixed to the pipe ends to reciprocate within the expansion channels during expansion or contraction of the pipe ends. The protrusions also restrain the degree of expansion or contraction of the pipes and protect the gasket. In another embodiment, an interior pipe coupling with a spreader bolt assembly is provided.

12 Claims, 6 Drawing Sheets

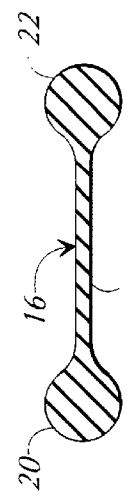
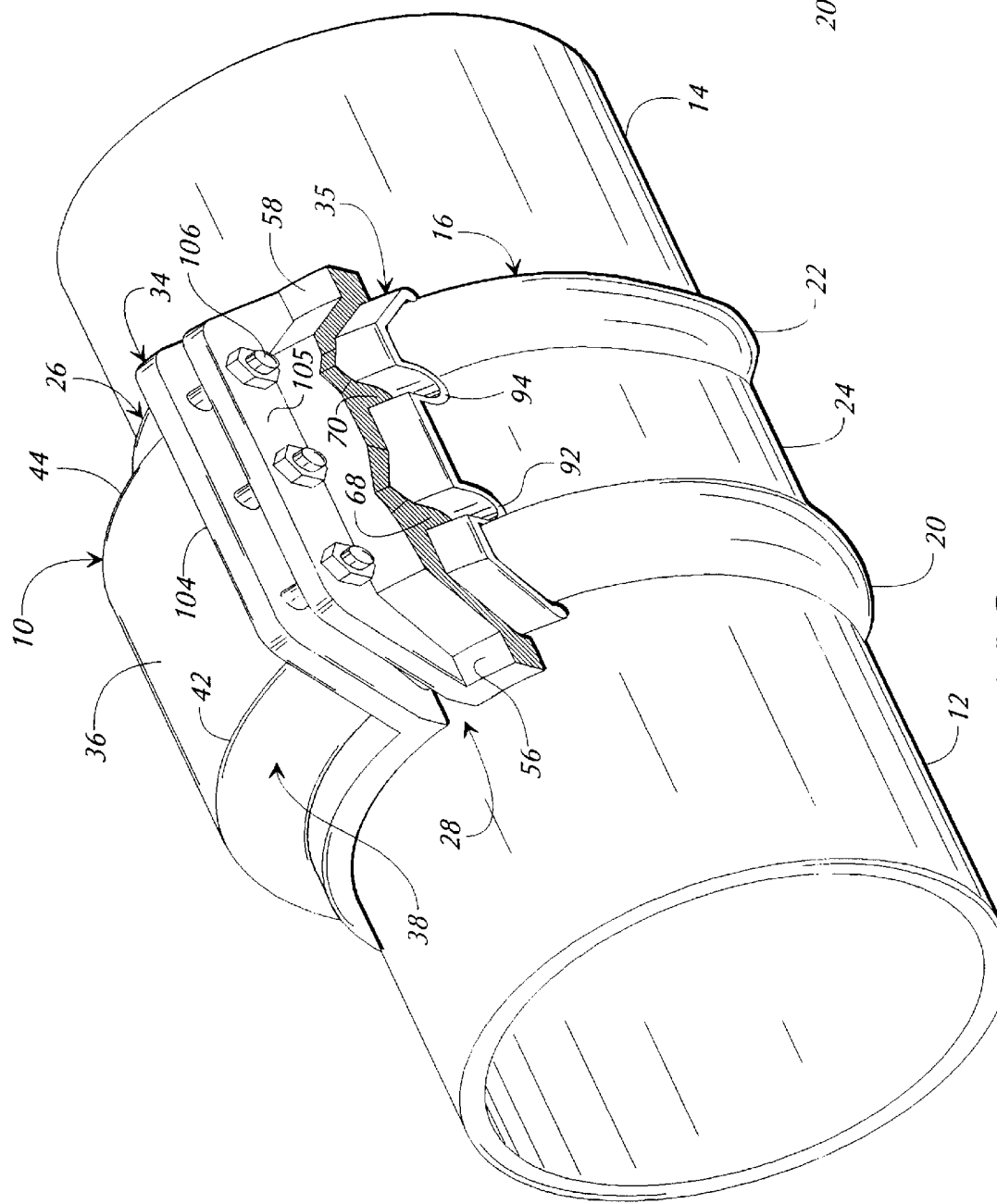

PIPE COUPLINGS FOR MISALIGNED OR OUT-OF-ROUND PIPES AND EXPANDING/CONTRACTING PIPES

This is a divisional application of application Ser. No. 08/541,491, filed Oct. 10, 1995 now abandoned.

TECHNICAL FIELD

The present invention relates to couplings for joining pipe ends and sealing the joint between the pipe ends. More particularly, this invention relates to couplings for sealing pipe joints when the connected pipes are offset, deflected, or out-of-round or the connecting pipes tend to significantly expand or contract.

BACKGROUND OF THE INVENTION

The sealing of pipe joints and other locations in pipes and pipelines is a critical concern, and proper sealing has become more important as efforts have increased to protect the environment. Liquid chemicals, sewage, toxic gases, and other fluid-like materials such as fine dust, must be conducted through pipelines without leakage of the material from the pipeline and without contamination from outside the pipeline. To seal pipe joints, pipeline installers typically encircle the joint with a cylindrical coupling consisting of either two semi-cylindrical pieces fastened together to clamp the pipe ends or a single cylindrical piece having an axial split which allows the coupling to be opened by an amount sufficient to fit over the pipe ends. A coupling with a cylindrical coupling member and an axial split is typically closed by bolting together closing plates or flanges mounted to the coupling on each side of the axial split until the coupling is snug against the pipe ends.

Annular gaskets may be fitted about the pipe ends beneath the coupling to block the escape of fluid between the coupling and the pipe ends. One type of gasket has a pair of annular gasket members, such as O-rings, connected by a continuous bladder and is sufficient by itself to block the escape of fluid. Another type of gasket is simply a pair of annular gasket members, such as O-rings, without a bladder. With this second type of gasket, a sealing plate is necessary to block the escape of fluid outwardly through the axial split of the coupling. Several prior devices for this purpose have been developed as described in U.S. Pat. Nos. 4,360,227; 1,607,943; 2,913,262; 3,153,550; 4,664,428; 5,086,809; and 5,383,496.

Pipe couplings can be installed on the exterior of a pipeline as disclosed in U.S. Pat. No. 5,383,496 or can be installed on the interior of a pipeline as disclosed in U.S. Pat. No. 5,076,618. Couplings generally are designed for pipes which are cylindrical and in good alignment. For a good seal with a minimum of material, the coupling tolerances are low. However, at times, pipes in a pipeline are offset, deflected, or out-of-round and the coupling cannot create a complete seal about the joint. In addition, a misaligned pipe can damage a gasket during or after installation if the edge of a misaligned pipe end pinches the gasket against the coupling. Another situation which can result in a leak is when a standard coupling is fitted about pipes that significantly expand or contract during use. During expansion, couplings can be dislodged from their position about a joint or the gasket of the coupling can be damaged or distorted, thereby disrupting the coupling seal.

Therefore, there is a need for pipe couplings for sealing joints between misaligned or out-of-round pipes and joints between pipes that significantly expand or contract during use.

Furthermore, there is a particular difficulty with interior pipe couplings in general. Interior pipe couplings are installed by using spreader bolts to spread the spreader plates of the coupling apart and expand the coupling so that the coupling is forced against the pipe or pipeline interior. This must be done inside the pipe or pipeline and is awkward. Thus, there is also a need for an interior pipe coupling that can be more easily installed.

SUMMARY OF THE INVENTION

The present invention solves the above-described problems by providing a pipe coupling for sealing pipe joints in a pipeline comprising an annular coupling member having an axial split and a pair of annular protrusions which form gasket channels for receiving annular gasket members and a central channel, between the gasket channels. The annular gasket members compress the gasket members against the pipes around the pipeline joint and the gasket channels accommodate some misalignment and out-of-roundness in the pipes. The gasket channels keep the annular gasket members from bunching as the coupling member is closed about the pipe joint, force the annular gasket members to conform to the shape of the gasket channels, and squeeze the annular gasket members properly for a better seal about the pipe joint.

More particularly, the pipe coupling of the present invention is useful for sealing a joint between pipes in a pipeline by compressing annular gasket members against the pipes around the joint. The pipe coupling comprises an annular coupling member having an axial split defined by first and second axial edges and a device for joining or closing the first and second axial edges. When the coupling is closed about a pipe joint, the coupling member compresses the annular gasket members against the pipes and the annular protrusions of the coupling press the annular gasket members outwardly and against the pipes. The annular coupling member comprises an annular bridging member extending between the first and second axial edges, opposing annular end members extending from annular edges of the bridging members to distal edges of the end members to form an annular coupling channel bounded by the bridging member and the end members, and a pair of annular protrusions spaced from one another and respective end members and extending from the bridging member into the coupling channel. The annular protrusions form gasket channels between the annular protrusions and respective end members for receiving the annular gasket members and form a central channel between the gasket channels for accommodating misalignment such as offset or deflection, or out-of-roundness in the pipes.

According to another aspect of the present invention, an expansion pipe coupling is provided for sealing a joint between pipes each having a retaining ring fixed to the pipe proximate the joint for retaining the coupling about the joint. The pipe coupling comprises an annular coupling member including two pairs of annular protrusions for forming a pair of gasket channels for receiving annular gasket members and a pair of expansion channels for receiving the retaining rings. The gasket channels function as described above and the expansion channels allow the retaining rings to reciprocate therein during expansion and contraction of the pipe ends. In addition, the annular protrusions prevent the retaining rings from engaging and damaging the annular gasket members during expansion and contraction of the pipe ends.

More particularly, the expansion pipe coupling comprises an annular coupling member having an axial split defined by first and second axial edges and a device for joining or closing the first and second axial edges such that the coupling member compresses the annular gasket members against the pipes and the annular protrusions prevent movement of the annular gasket members relative to the coupling member during expansion or contraction of the pipes. The annular coupling member comprises an annular bridging member extending between the first and second axial edges, opposing annular end members extending from annular edges of the bridging member to distal edges of the end members to form an annular coupling channel bounded by the bridging member and the end members, a pair of inner annular protrusions spaced from one another and respective end members and extending from the bridging member into the annular coupling channel, and a pair of outer protrusions. One annular protrusion extends from one of the end members into the annular coupling channel and is spaced from the distal edge of the one end member and the adjacent inner annular protrusion to form a first expansion channel and a first gasket channel. The first expansion channel is positioned between the distal edge of the one end member and the one outer annular protrusion and receives one of the retaining rings. The first gasket channel is positioned between the one outer annular protrusion and the adjacent inner annular protrusion and receives one of the annular gasket members. The other annular outer protrusion extends from another of the end members into the annular coupling channel and is spaced from the distal edge of the other end member and the adjacent inner annular protrusion to form a second expansion channel and a second gasket channel. The second expansion channel is positioned between the distal edge of the other end member and the other outer annular protrusion and receives another of the retaining rings. The second gasket channel is positioned between the other outer annular protrusion and the adjacent inner annular protrusion and receives another of the annular gasket members.

The present invention also encompasses a pipe coupling assembly for sealing a joint between pipe ends comprising a gasket, an annular coupling member having an axial split defined by first and second axial edges, and a device for joining or closing the first and second axial edges such that the coupling member compresses the gasket. The gasket comprises a pair of spaced annular gasket members for fitting about respective pipe ends and a continuous bladder extending between the annular gasket members for sealing the joint between the pipes. The annular coupling member comprises an annular bridging member, opposing annular end members, and a pair of annular protrusions spaced from one another and respective end members. The annular protrusions extend from the bridging member into an annular coupling channel bounded by the bridging member and the end members. The annular protrusions form gasket channels between the annular protrusions and respective end members for receiving the annular gasket members and form a central channel between the gasket channels for accommodating misalignment or out-of-roundness of the pipes.

According to still another aspect of the invention, an interior pipe coupling assembly is provided to solve problems associated with the installation of the interior pipe coupling within a pipe or pipeline. This interior pipe coupling assembly includes an expandable spreader bolt assembly which can be pivotably disposed between spreader plates of the coupling for expanding the coupling.

More particularly, this interior pipe coupling assembly comprises an annular coupling member having an axial split defined by first and second axial edges, a pair of spreader plates extending from the axial edges, and the spreader bolt assembly which is positionable between the spreader plates. One of the spreader plates extends inwardly from the coupling member along the first axial edge of the coupling member and another of the spreader plates extends inwardly from the coupling member along the second axial edge so that the spreader plates face one another. Each of the spreader plates has a socket facing the opposing spreader plate.

The spreader bolt assembly includes a spreader bolt and a spreader coupling. The spreader bolt includes a head, a ball fixed to and extending from one side of the head, and a threaded rod fixed to and extending from an opposite side of the head. The spreader coupling comprises a sheath having a threaded passage for receiving the threaded rod of the spreader bolt and a ball fixed to and extending from one end of the sheath. The spreader bolt assembly can be positioned between the spreader plates with the threaded rod threaded into the sheath. The ball of the spreader bolt can be pivotably engaged with the socket of the one spreader plate and the ball of the spreader coupling can be pivotably engaged with the socket of the other spreader plate so that the spreader plates can be spread apart by turning the spreader bolt relative to the spreader coupling so as to feed the spreader bolt outwardly from the spreader coupling. This forces the annular coupling member against the pipe ends to create a seal between the coupling and the pipe ends.

Thus, an object of the invention is to provide an improved apparatus for sealing pipe joints in pipelines.

Another object of the invention is to provide an apparatus for sealing joints between misaligned or out-of-round pipes.

A further object of the invention is to provide an apparatus for sealing joints between pipes which significantly expand or contract during use.

Still another object of the invention is to provide an interior pipe coupling that is more easily installed within a pipe or pipeline.

Other objects, features and advantages of the invention will become apparent from the following detailed description of embodiments of the invention, when taken in conjunction with the accompanying drawings and dependent claims.

BRIEF DESCRIPTION OF DRAWINGS

FIG. 1 is a perspective view of an embodiment of a pipe coupling of the present invention mounted about two pipe ends. The coupling shown in this figure is in the closed position and a portion of the coupling has been broken away to reveal interior components.

FIG. 2 is a cross-sectional elevational view of the gasket of the coupling shown in FIG. 1.

DETAILED DESCRIPTION OF DRAWINGS

Figure 6:
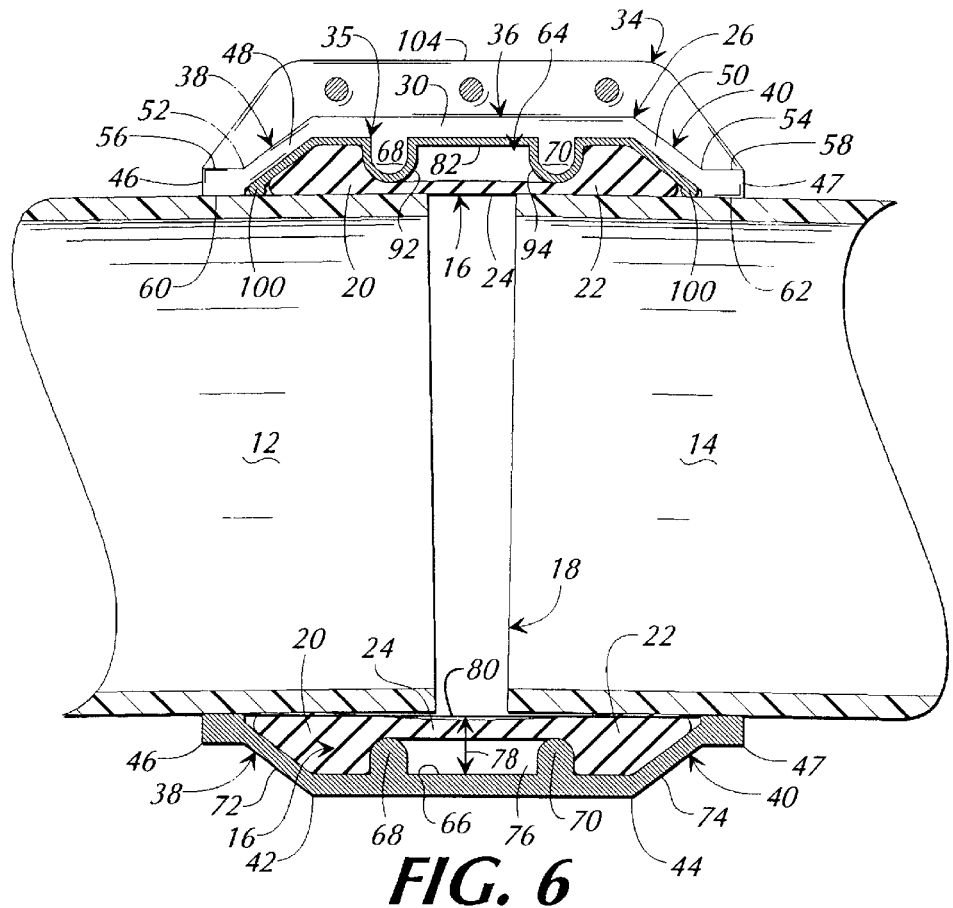
FIG. 6 is a cross-sectional side elevation view of the pipe coupling shown in FIG. 1.

Referring now in more detail to the drawings, in which like numerals refer to like parts throughout the several views, FIG. 1 shows an exterior pipe coupling 10 according to an embodiment of the present invention. The pipe coupling 10 is shown in place and closed about adjacent pipe ends 12 and 14 with portions of the pipe coupling broken away to expose interior parts. As can be seen, the pipe coupling 10 fits over a gasket 16 which extends over a joint 18 between the pipe ends. The joint 18 is best shown in FIG. 6.

The gasket 16 comprises a pair of spaced annular gasket members 20 and 22 connected by a continuous bladder 24 which extends between the annular gasket members. The gasket 16 is best shown in FIG. 2 and desirably comprises an elastomeric material. The annular gasket members 20 and 22 are desirably O-rings which are substantially circular in cross-section and form expanded portions along the edges of the bladder 24.

Figure 3:
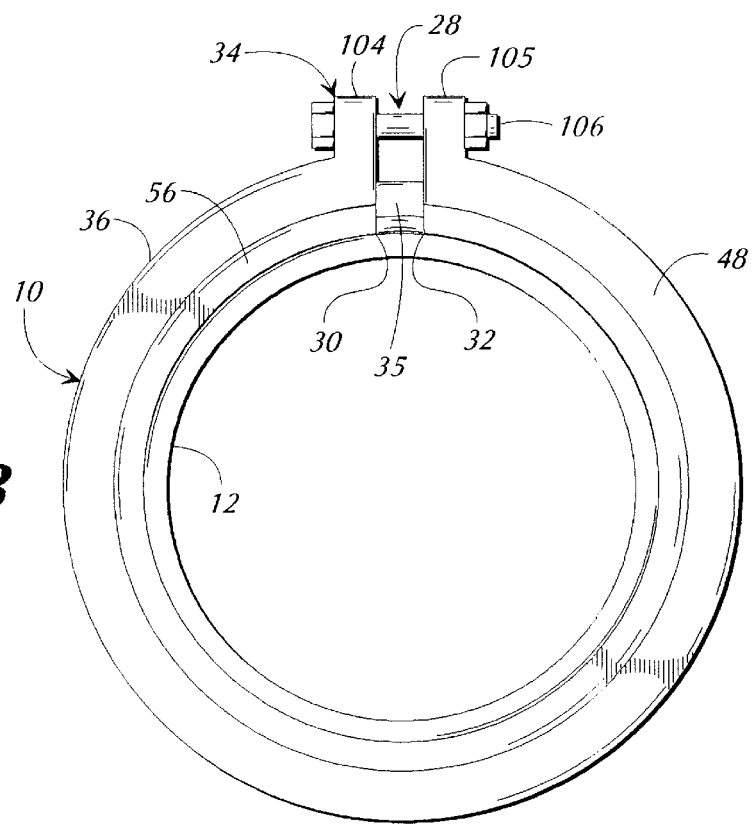
FIG. 3 is an end elevation view of the pipe coupling shown in FIG. 1.
Figure 4:
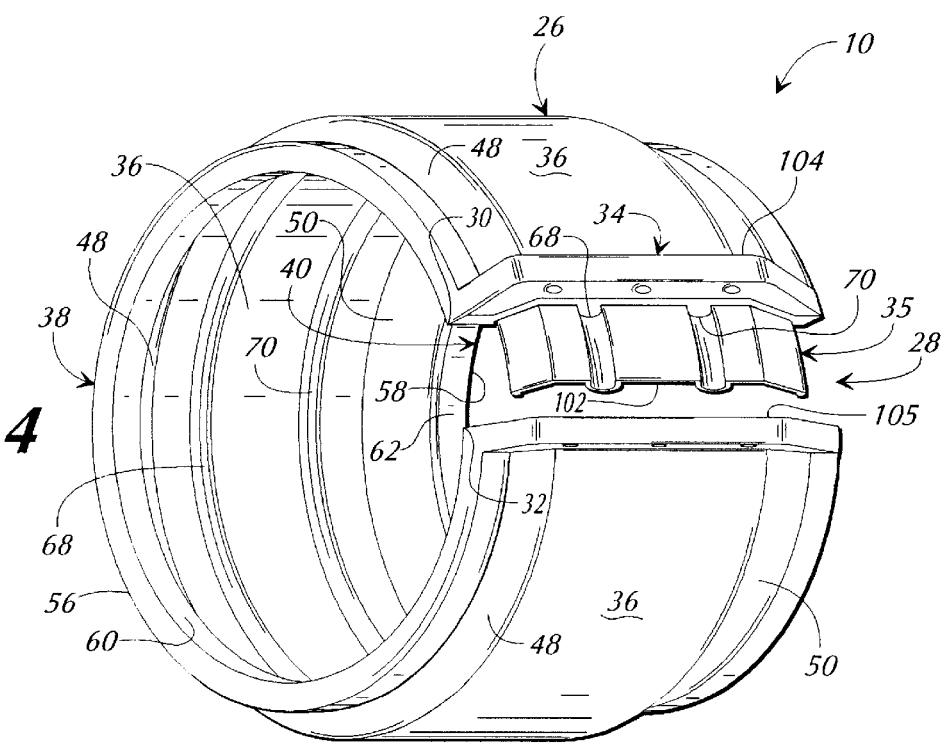
FIG. 4 is a perspective view of the pipe coupling shown in FIG. 1 with the closure plates spread apart and the sealing plate revealed.

The pipe coupling 10 comprises an annular coupling member 26 having an axial split 28 defined by first and second axial edges 30 and 32. The axial split 28, which is best shown in FIGS. 3 and 4, allows the pipe coupling 10 to be opened and fitted about the pipe ends 12 and 14. The pipe coupling 10 further comprises a joining or closure device 34 for closing the pipe coupling and fastening the first and second axial edges 30 and 32 of the annular coupling member 26 together until the coupling fits snugly against the pipe ends. The pipe coupling 10 also includes a sealing plate 35 for sealing the joint 18 in the annular coupling member 26 at the axial split 28.

The annular coupling member 26 comprises an annular bridging member 36, which is cylindrical in shape and extends between the first and second axial edges 30 and 32, and annular end members 38 and 40 extending from annular edges 42 and 44 of the bridging member to distal edges 46 and 47 of the end members. The end members 38 and 40 each comprise a sloped end wall 48 and 50 extending form the respective edge 42 or 44 of the bridging member to a distal edge 52 or 54. The end members 38 and 40 also each include a shoulder 56 and 58 extending outwardly from the respective distal edge 52 or 54 of the end wall 48 and 50 such that the shoulders fit against the pipe ends 12 and 14 when the coupling 10 is fitted about the joint 18 between the pipe ends and the first and second axial edges 30 and 32 of the annular coupling member 26 are joined. More particularly, the shoulders 56 and 58 of the annular coupling 26 member have interior surfaces 60 and 62 that fit against the pipe ends 12 and 14 when the coupling 10 is closed.

The annular bridging member 36 and the annular end members 38 and 40 form an annular coupling channel 64. More particularly, the annular coupling channel 64 is defined by the interior surface 66 of the annular coupling member 26. As best shown in FIGS. 4 and 6, a pair of annular protrusions 68 and 70 are affixed to the interior surface 66 of the annular coupling member 26, particularly the annular bridging member 36, and extend between the first and second axial edges 30 and 32 of the annular coupling member. The annular protrusions 68 and 70 are desirably rods welded to the annular bridging member 36 and extend from the bridging member 36 into the annular coupling channel 64. The annular protrusions 68 and 70 are spaced from one another and respective end members 38 and 40 to form gasket channels 72 and 74 between the annular protrusions and respective end members 38 and 40 for receiving the annular gasket members 20 and 22 or O-rings and form a central channel 76 between the gasket channels. As best shown in FIG. 6, the annular coupling member 26 fits about the joint 18 between the pipe ends 12 and 14 and over the gasket 16. The expanded portions or annular gasket members 20 and 22 fit tightly within the gasket channel 72 and 74 and the bladder 24 extends between the annular gasket members, between the annular protrusions 68 and 70 and the pipe ends 12 and 14, and over the joint 18 between the pipe ends.

The central channel 76 in the annular coupling channel 64 has a depth 78 that accommodates some offset, deflection, or out-of-roundness in the pipes. FIG. 6 illustrates the situation of deflected pipe ends 12 and 14. The gasket 16 is sized and the depth 78 of the central channel of the annular coupling channel 64 is set such that the pipe ends 12 and 14 at the widest portion of the joint 18 can protrude into the annular coupling channel without shearing or otherwise damaging the gasket and a sufficient seal is maintained about the joint including the portion of the joint wherein the pipe ends are the closest. The depth 78 of the annular coupling channel 64 at the central channel 76 extends perpendicularly from an axial line 80 connecting interior surfaces 60 and 62 of opposing shoulders 56 and 58 to the interior surface bridging member 36. The annular protrusions 68 and 70 extend into the annular coupling channel 64 a distance which is short of the depth 78 of the annular coupling channel at the central channel 76 so that the annular protrusions do not damage or interfere with the gasket 16.

Figure 5:
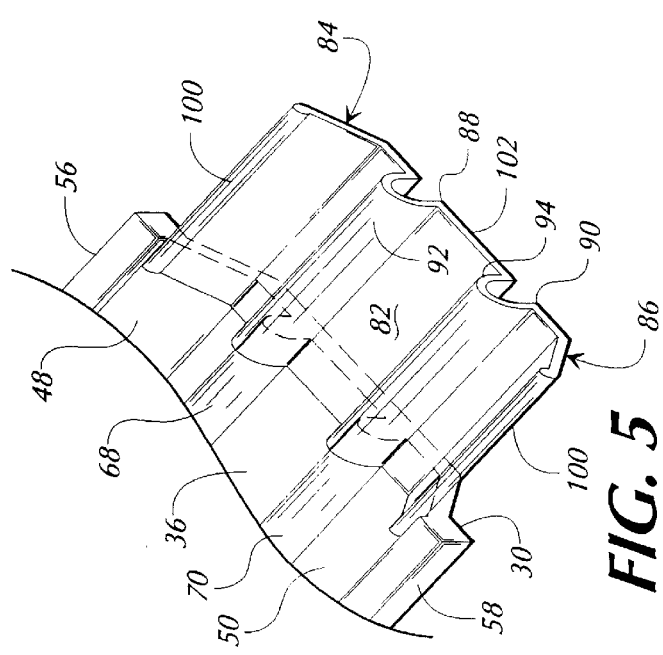
FIG. 5 is a partial perspective view of the pipe coupling shown in FIG. 1 illustrating the underside of the sealing plate.

The sealing plate 35 of the pipe coupling 10 is best shown in FIGS. 4 and 5 and is useful for sealing the axial split 28 of the coupling member 26 when the coupling 10 is fitted about the joint 18 between the pipe ends 12 and 14 and the first and second axial edges 30 and 32 of the coupling member are joined. The sealing plate 35 is attached to the interior surface 66 of the annular coupling channel by means such as welding. The sealing plate 35 has a shape which corresponds to the contour of the coupling member 26 so that the structure of the coupling 10 is not interrupted at the axial split 28. The sealing plate 35 comprises a bridging member 82 which corresponds to the bridging member 36 of the coupling member 26 and end members 84 and 86 extending outwardly from circumferential edges of the bridging member. The end members 84 and 86 of the sealing plate 35 slope outwardly and correspond to the end walls 48 and 50 of the coupling member 26.

The bridging member 82 of the sealing plate 35 has a pair of spaced grooves 88 and 90 for receiving the annular protrusions 68 and 70 of the coupling member 26 and a pair of corresponding protrusions 92 and 94 which correspond to the annular protrusions of the coupling member and press the annular gasket members 20 and 22 of the gasket 16 outwardly and against the pipe ends 12 and 14 when the coupling 10 is closed. The sealing plate 35 also includes stiffening rods 100 welded to the outer edges of the sealing plate end members 84 and 86 for stiffening the sealing plate. The sealing plate 35 extends from the interior surface 66 of the annular coupling channel 64, past the first axial edge 30 of the axial split 28, to an axial edge 102 of the sealing plate. When the coupling 10 is closed, the axial edge 102 of the sealing plate 35 passes under the second axial edge 32 of the coupling member 26 and the sealing plate seals the axial split 28 of the coupling member.

Alternatively, the coupling member 10 can be used with a gasket having no bladder. In such a case, the gasket would comprise a pair of spaced annular gasket members or O-rings and the sealing plate 35 would include an axial sealing member attached to the axial edge 102 of the sealing plate such as is disclosed in the U.S. Pat. No. 5,383,496, the disclosure of which is incorporated herein by reference.

The closure 34 of the pipe coupling 10 comprises a pair of closure plates or flanges 104 and 105 extending outwardly from the coupling member 26 along the first and second axial edges 30 and 32, respectively. The closure plates 104 and 105 are mounted to the annular coupling member 26 by means such as welding. Each of the closure plates 104 and 105 have three holes for receiving bolts 106 which are used to join the closure plates together, thereby joining the first and second axial edges 30 and 32 of the coupling member 26. The holes in the closure plates 104 and 105 are aligned with one another and are larger than the diameter of the bolts 106 so that the bolts can be inserted through the holes while the pipe coupling 10 is still open and the closure plates are spaced from and at an angle to one another. Alternatively, clamps or any other appropriate means for joining the axial edges 30 and 32 of the coupling member 26 can be used. In addition, clamps or the like can be used instead of bolts to hold the closure plates 104 and 105 together.

The construction of the components of the pipe coupling 10 can vary as is understood by those skilled in the art. The material for such components must not be subject to significant corrosion by the substance within the pipeline, and some pipelines must be resistant to deterioration caused by the external environment, such as water, a corrosive atmosphere, the weather, or other particular environment. Carbon and stainless steel are preferred for most applications. The preferred thickness of the components varies with the diameter of the coupling and the pressure within the pipeline.

Installation of the pipe coupling 10 is apparent from the foregoing description. The gasket 16 is fitted about the pipe ends 12 and 14 by pulling the gasket over one of the pipe ends and fitting one of the annular gasket members 20 and 22 about the one pipe end so that the bladder 24 of the gasket extends outwardly from the one pipe end. The pipe coupling 10 can then be slipped over the one of the pipe ends 12 and 14 by spreading the annular coupling member 26 apart at the axial split 28 and slipping the pipe coupling over the one pipe end. The other of the pipe ends 12 and 14 is then brought into place adjacent the one pipe end and the gasket 16 and coupling 10 is fitted about that other pipe end so that the bladder 24 of the gasket extends over the joint 18. The gasket channels 72 and 74 of the coupling member 26 are positioned over the annular gasket members 20 and 24 and the closure plates 104 and 105 are brought together to compress the annular gasket members 20 and 22. Fluid within the pipeline passing outwardly from the pipe ends 12 and 14 cannot pass beyond the gasket 16.

Figure 7:
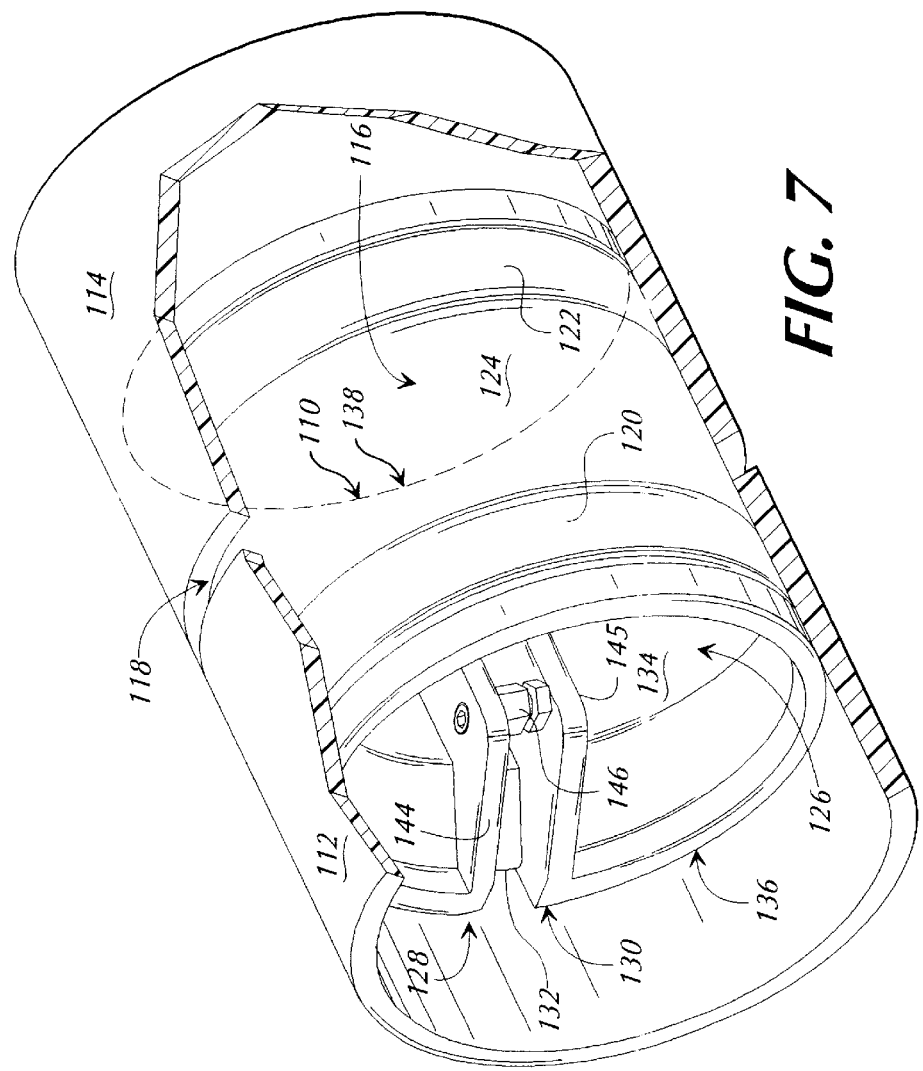
FIG. 7 is a partial perspective view of another embodiment of the present invention which is an interior pipe coupling. Portions of the pipe ends are broken away to reveal the components of the coupling.
Figure 8:
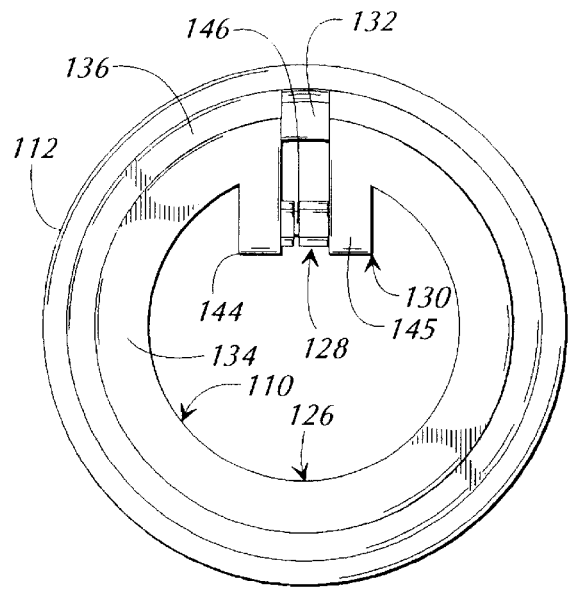
FIG. 8 is an end elevation view of the interior pipe coupling shown in FIG. 7.
Figure 9:
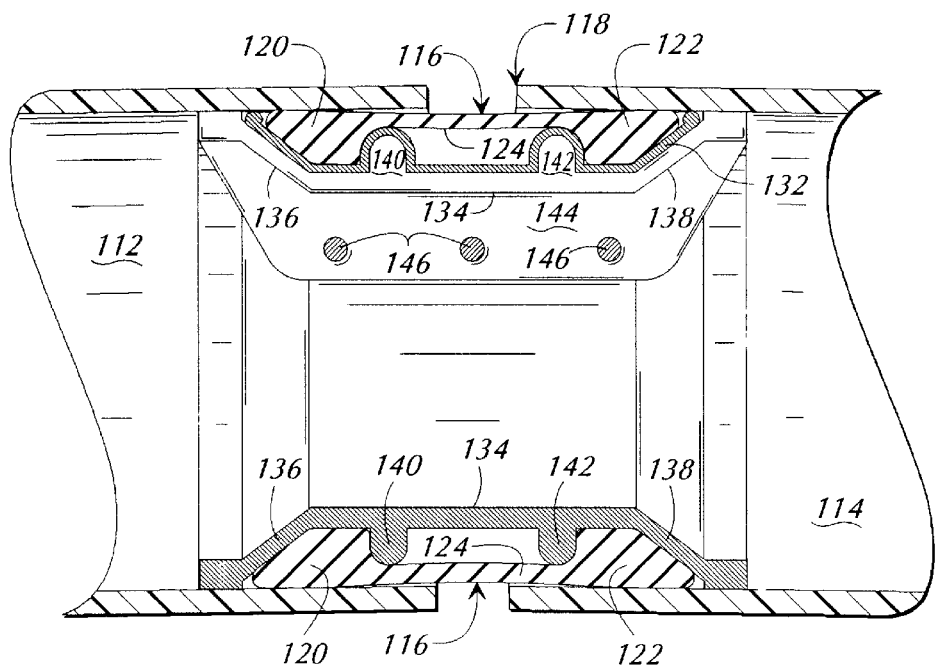
FIG. 9 is a cross-sectional side elevation view of the interior coupling shown in FIG. 7.

The fundamental structure of the external pipe coupling 10 shown in FIGS. 1–6 can also form an interior pipe coupling, an embodiment of which is shown at 110 in FIGS. 7–9. The interior pipe coupling 110 is essentially the exterior pipe coupling 10 shown in FIGS. 1–6 turned inside out. Accordingly, the components of the interior pipe coupling 110 is not described in as much detail as is the exterior pipe coupling 10.

The interior pipe coupling 110 is shown in FIG. 7 mounted about a pair of adjacent pipe ends 112 and 114. Portions of the pipe ends 112 and 114 shown in FIG. 7 are broken away to reveal the components of the interior pipe coupling 110. As can be seen, the interior pipe coupling 110 fits over a gasket 116 which seals the joint 118 between the pipe ends 112 and 114. The gasket 116 seals the joint 118 between the pipe ends 112 and 114 in the same manner that the gasket 16 of the exterior pipe coupling 10 functions. The gasket 116 of the interior pipe coupling 110 has the same structure as the gasket 16 for the exterior pipe coupling 10 and comprises a pair of annular gasket members 120 and 122 or O-rings connected by a continuous bladder 124.

Like the exterior pipe coupling 10, the interior pipe coupling 110 comprises an annular coupling member 126 having an axial split 128, a spreader device 130 at the axial split, and a sealing plate 132 for sealing the axial split 128.

The annular coupling member 126 of the interior pipe coupling 110, like the coupling member 26 of the exterior pipe coupling 10 comprises an annular bridging member 134, annular end members 136 and 138 extending outwardly from opposing annular edges of the bridging members, and a pair of spaced annular protrusions 140 and 142 extending from the annular bridging member into the coupling channel formed by the bridging member and end members. The spreader device 130 of the interior pipe coupling 110 comprises a pair of flanges or spreader plates 144 and 145 mounted to the coupling member 126 at the axial split 128. The spreader plates 144 and 145 are connected to one another with spreader bolts 146 extending through holes in the spreader plates.

The interior pipe coupling 110 is installed in a similar manner as is the exterior pipe coupling 10. The spreader plates 144 and 145 of the interior pipe coupling 110 are clamped together to reduce the diameter of the pipe coupling and the gasket 116 is stretched onto the central part of the coupling. The pipe coupling is then inserted between the pipe ends 112 and 114 and positioned within the pipe ends so that the gasket and pipe coupling extend over the joint 118. The spreader plates 144 and 145 are then unclamped and spread apart with a tool so that the spreader bolts 146 can be inserted between the spreader plates. The spreader bolts 146 are then tightened so that spreader plates 144 and 145 expand outwardly and press the coupling member 126 against the gasket 116 to seal the joint 118 between the pipe ends 112 and 114. The method for installing such an interior pipe coupling is well known to those skilled in the art and is described in detailed in U.S. Pat. No. 5,076,618, the disclosure of which is incorporated herein by reference.

Figure 10:
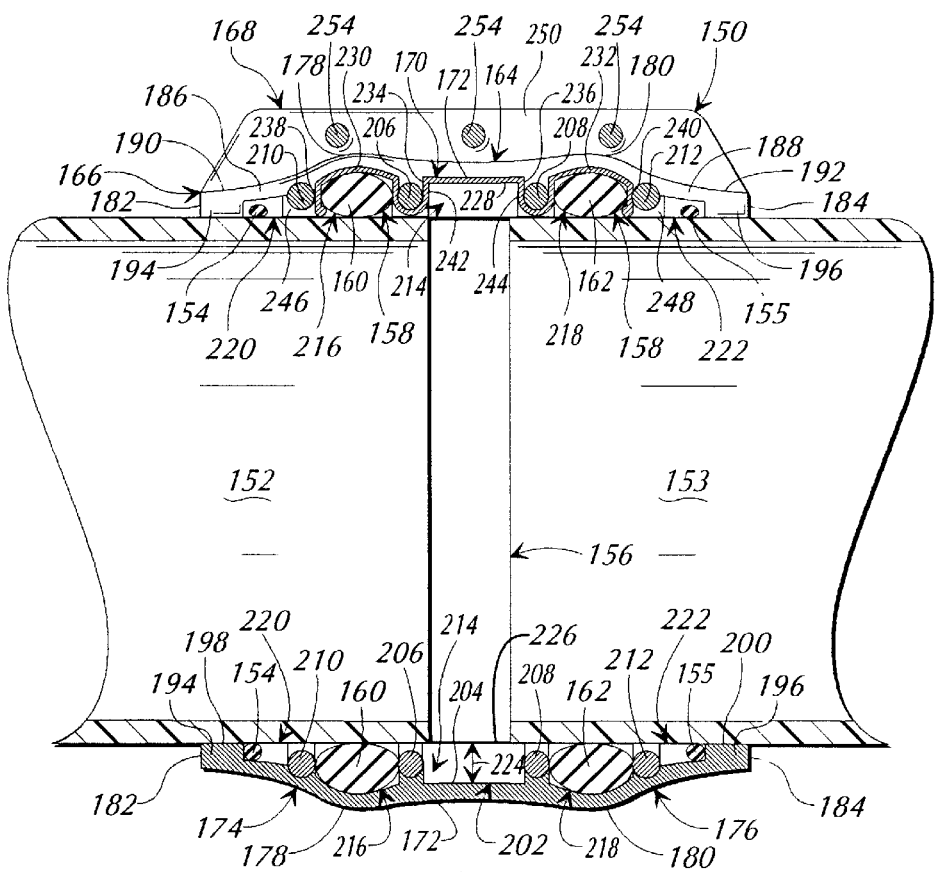
FIG. 10 is a cross-sectional side elevation view of a pipe coupling made according to another embodiment of the present invention. This pipe coupling is particularly useful to seal joints between pipes which expand or contract during use.

The fundamental structure of the exterior and interior pipe couplings 10 and 110 shown in FIGS. 1–9 may also be used, with some modification, to form an expansion coupling, an embodiment of which is shown at 150 in FIG. 10. The expansion coupling 150 is designed to accommodate substantial expansion and contraction of pipe ends 152 and 153 about which the expansion coupling is mounted. Before the expansion coupling 150 is mounted about the pipe ends 152 and 153, retaining rings 154 and 155 are fixed to the respective pipe ends proximate the joint 156 between the pipe ends for retaining the expansion coupling in position relative to the joint between the pipe ends.

The expansion coupling 150 is fitted about a gasket 158 which comprises a pair of annular gasket members 160 and 162 or O-rings fitted about the respective pipe ends 152 and 153 inside of the retaining rings 154 and 155. The gasket 158 shown in FIG. 10 has no bladder; however, it should be understood that the coupling 150 can be used with a continuous bladder type gasket.

The expansion coupling 150 comprises an annular coupling member 164 having an axial split 166, a closure device 168 mounted at the axial split, and a sealing plate 170 for sealing the axial split.

The annular bridging member 172 of the expansion coupling 150 comprises a pair of annular end members 174 and 176 extending from respective annular edges 178 and 180 of the bridging member 172 to distal edges 182 and 184. The end members 174 and 176 each comprise a sloped end wall 186 and 188 extending from the respective edge 178 or 180 of the bridging member 172 to respective distal edges 190 and 192. The annular end members 174 and 716 also include respective shoulders 194 and 196 extending outwardly from the distal edges 190 and 192 of the end walls 186 and 188 such that the shoulders fit against the pipe ends 152 and 153 when the expansion coupling 150 is fitted about the joint 156 between the pipe ends and the axial split 166 of the coupling member 164 is closed.

The annular bridging member 172 and the annular end members 174 and 176 form an annular coupling channel 202 having an interior surface 204. A pair of inner annular protrusions 206 and 208, spaced from one another and respective end members 174 and 176, extend from the bridging member 172 into the annular coupling channel 202. The inner annular protrusions 206 and 208 are desirably rods which are welded to the interior surface of the coupling channel 202 and extend about the entire coupling member 164. The coupling member 164 also includes a pair of outer annular protrusions 210 and 212. One outer annular protrusion 210 extends from one of the end members 174 into the annular coupling channel 202 and is spaced from the distal edge 182 of the one end member and the adjacent inner annular protrusion 206. The other outer annular protrusion 212 extends from another of the end members 176 into the annular coupling channel 202 and is spaced from the distal edge 184 of the other end member and the adjacent inner annular protrusion 208.

The inner protrusions 206 and 208 and the outer protrusions 210 and 212 partition the annular coupling channel 202 into central channel 214, first and second gasket channels 216 and 218, and first and second expansion channels 220 and 222. The inner annular protrusions 206 and 208 define the central channel 214 which extends between the inner annular protrusions. The first gasket channel 216 extends between the one outer annular protrusion 210 and the adjacent inner annular protrusion 206 and receives one of the annular gasket members 160. The second gasket channel 218 extends between the other outer annular protrusion 212 and the adjacent inner annular protrusion 208 and receives the other annular gasket member 162. The first expansion channel 220 extends between the one outer annular protrusion 210 and the adjacent end member shoulder 194 and receives one of the retaining rings 154. The second expansion channel 222 extends between the other outer annular protrusion 212 and the adjacent shoulder 196 and receives the other retaining ring 155. When the expansion coupling 150 is installed about the pipe ends 152 and 153 over the gasket 158, the coupling member 164 compresses the annular gasket members 160 and 162 against the pipe ends and the inner and outer annular protrusions 206, 208, 210, and 212 prevent movement of the annular gasket members relative to the coupling member during expansion or contraction of the pipes. The first and second expansion channels 220 and 222 allow reciprocation of the respective retaining rings 154 and 155 therein and the outer annular protrusions 210 and 212 prevent the retaining rings 154 and 155 from engaging the annular gasket members 160 and 162. In addition, the outer annular protrusions 210 and 212 and the shoulders 194 and 196 restrain the degree of expansion or contraction of the pipe ends. The sizes of the expansion channels 220 and 222 may vary depending on the coefficient of expansion of the pipe ends and the temperatures to which the pipe ends will be exposed.

The central channel 214 of the annular coupling channel 202 has a depth extending perpendicularly from an axial line 226 connecting interior surfaces 198 and 200 of opposing shoulders 194 and 196 to the interior surface 204 of the coupling channel. The inner and outer annular protrusions 206, 208, 210, and 212 extend into the coupling channel 202 a distance which is short of the depth of the coupling channel. In addition, as with the exterior coupling 10 shown in FIGS. 1–6, the central channel 214 of the expansion pipe coupling 150 accommodates some offset, deflection, or out-of-roundness of the pipe ends 152 and 153 due to the depth of the central channel.

The sealing plate 170 of the expansion coupling 150, like the sealing plate 35 of the exterior coupling 10 described above, has a shape which corresponds to the contour of the coupling member 164. Accordingly, the sealing plate 170 comprises a bridging member 228 which corresponds to the bridging member 172 of the coupling member 164, and end members 230 and 232 which are sloped and correspond to the end walls 186 and 188 of the coupling member. In addition, the bridging member 228 has a pair of grooves 234 and 236 spaced from one another for receiving the inner annular protrusions 206 and 208 of the coupling member 164 and the end members 230 and 232 of the sealing plate have grooves 238 and 240 for receiving the outer annular protrusions 210 and 212 of the coupling member. The sealing plate 170 is welded to the interior surface 204 of the coupling channel 202 and extends across the axial split 166 of the coupling member 164 to seal the axial split in the same way as the sealing plate 35 of the external pipe coupling 10 described above. Protrusions 242, 244, 246, and 248 correspond to the grooves 234, 236, 238, and 240 of the sealing plate 170 and function in the same manner as the inner annular protrusions 206 and 208 and outer annular protrusions 210 and 212 across the axial split 166.

Because the gasket 158 of the expansion coupling 150 has no bladder, the sealing plate 170 should comprise an axial seal across the distal edge of the sealing plate to complete seal the axial split 166. Such an axial seal is disclosed in U.S. Pat. No. 5.383,496 which is previously incorporated herein by reference.

The closure 168 of the expansion coupling 150 comprises a pair of flanges or closure plates 250 and 252 mounted to the coupling member 164 at the axial split 166 and are connected by bolts 254 extending through holes in the flanges. The expansion coupling 150 is mounted about the pipe ends 152 and 153 and closed in the same manner as the exterior coupling 10 described above.

Figure 11:
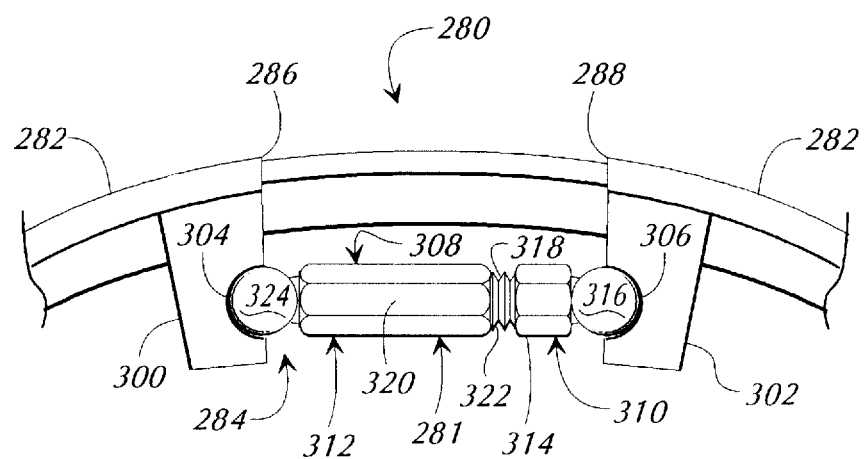
FIG. 11 is a partial end elevation view of an interior pipe coupling made according to another embodiment of the invention illustrating an alternative spreader bolt assembly in a retracted position.
Figure 12:
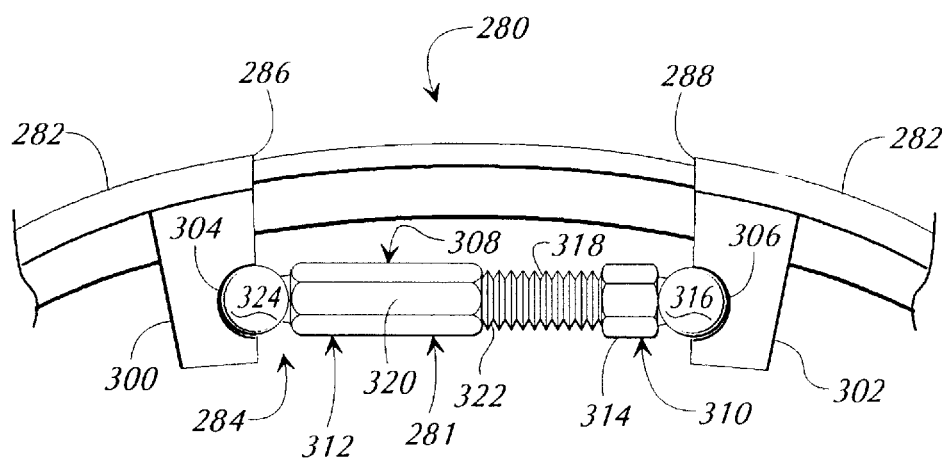
FIG. 12 is a partial end view of the interior pipe coupling shown in FIG. 11 with the spreader bolt assembly in an expanded position.

Another embodiment of the invention is shown in FIGS. 11 and 12 and is an interior pipe coupling assembly 280 featuring an alternative spreader device 281. Only a portion of the interior pipe coupling assembly 280 is shown in FIGS. 11 and 12 because the portion of the assembly not shown can have the same structure as the interior coupling 110 described above.

The interior pipe coupling assembly 280 comprises an annular coupling member 282 having an axial split 284 defined by first and second axial edges 286 and 288. In addition, the interior pipe coupling assembly 280 includes a pair of spreader plates 300 and 302. A first spreader plate 300 extends inwardly from the coupling member 282 along the first axial edge 286 and the second spreader plate 302 extends inwardly from the coupling member along the second axial edge 288 so that the spreader plates face one another. Each of the spreader plates 300 and 302 has a socket 304 and 306 facing the opposing spreader plate.

The spreader device 281 comprises a spreader bolt assembly 308 including a spreader bolt 310 and a spreader coupling 312. The spreader bolt 308 spreads the spreader plates 300 and 302 apart and forces the annular coupling members 282 against the associated pipe ends.

The spreader bolt 310 includes a head 314, a ball 316 fixed to and extending from one side of the head, and a threaded rod 318 fixed to and extending from an opposite side of the head. The head 314 of the spreader bolt 310 is desirably in the shape of a polyhedron such as a hexagon so that it may be manipulated with a wrench. The spreader coupling 312 includes a sheath 320 having a threaded passage 322 for receiving the threaded rod 318 of the spreader bolt 310 and a ball 324 fixed to and extending from one end of the sheath. The spreader coupling also is desirably in the shape of a polyhedron such as a hexagon so that it too may be manipulated by a tool such as a wrench.

After the interior pipe coupling 280 is disposed within a pipe or pipeline, the spreader bolt assembly 308 is positioned between the spreader plates 300 and 302 with the threaded rod 318 threaded into the sheath 320 of the spreader coupling 312. The ball 316 of the spreader bolt 310 is pivotally engaged with the socket 306 of the second spreader plate 302 and the ball 324 of the spreader coupling 312 is pivotally engaged with the socket 304 of the first spreader plate 300. The spreader plates 300 and 302 are then spread apart by turning the spreader bolt 310 relative to the spreader coupling, such as with wrenches, so as to feed the spreader bolt outwardly from the spreader coupling. This expands the coupling member 282 and forces the coupling member 282 against the pipe or pipe ends.

Those skilled in the art will understand that the couplings of the present invention are not limited to embodiments having a single axial split and a single closure device. Instead, the couplings can be made with two semi-cylindrical halves so that there would be two axial splits and two sets of closure plates. The details of such a pipeline will be understood by those skilled in the art in view of the above-described embodiments.

The foregoing description relates only to embodiments of the present invention, and the numerous changes and modifications may be made therein without departing from the scope of the invention as defined in the following claims.

I claim:

1. A pipe coupling for sealing a joint between pipes in a pipeline by compressing annular gasket members against the pipes around the joint, the pipes each having a retaining ring fixed to the pipe proximate the joint for retaining the coupling about the joint, the pipe coupling comprising:
   A. an annular coupling member having an axial split defined by first and second axial edges and comprising (1) an annular bridging member extending between the first and second axial edges, (2) opposing annular end members extending from annular edges of the bridging member to distal edges of the end members to form an annular coupling channel bounded by the bridging member and the end members, (3) a pair of inner annular protrusions spaced from one another and respective end members and extending from the bridging member into the annular coupling channel, and (4) a pair of outer annular protrusions, (a) one outer annular protrusion extending from one of the end members into the annular coupling channel and spaced from the distal edge of the one end member and the adjacent inner annular protrusion to form (i) a first expansion channel between the distal edge of the one end member and the one outer annular protrusion for receiving one of the retaining rings and (ii) a first gasket channel between the one outer annular protrusion and the adjacent inner annular protrusion for receiving one of the annular gasket members and (b) the other outer annular protrusion extending from another of the end members into the annular coupling channel and spaced from the distal edge of the other end member and the adjacent inner annular protrusion to form (i) a second expansion channel between the distal edge of the other end member and the other outer annular protrusion for receiving another of the retaining rings and (ii) a second gasket channel between the other outer annular protrusion and the adjacent inner annular protrusion for receiving another of the annular gasket members; and
   B. means for joining the first and second axial edges such that the coupling member compresses the annular gasket members against the pipes and the inner and outer annular protrusions prevent movement of the annular gasket members relative to the coupling member during expansion or contraction of the pipes, the first and second expansion channels allowing reciprocation of the respective retaining rings therein and the outer annular protrusions preventing the retaining rings from engaging the annular gasket members.

2. A pipe coupling as in claim 1 wherein the end members each comprise an end wall extending from the respective edge of the bridging member to a distal edge and a shoulder extending outwardly from the distal edge of the end wall such that the shoulders fit against the pipes when the coupling is fitted about the joint and the first and second axial edges are joined.

3. A pipe coupling as in claim 2 wherein the bridging member has an interior surface, the shoulders have interior surfaces for contacting the pipes, and the annular coupling channel has a depth extending perpendicularly from an axial line connecting interior surfaces of opposing shoulders to the interior surface of the bridging member, the inner and outer annular protrusions extending into the annular coupling channel a distance which is short of the depth of the annular coupling channel.

4. A pipe coupling as in claim 2 wherein the end walls slope outwardly from the bridging member.

5. A pipe coupling as in claim 4 wherein the coupling member has a contour and the sealing plate has shape which corresponds to the contour of the coupling member and has spaced grooves for receiving the inner and outer annular protrusions of the coupling member and corresponding protrusions for receiving the annular gasket members.

6. A pipe coupling as in claim 1 wherein each inner annular protrusion comprises a rod welded to the bridging member and each outer annular protrusion comprises a rod welded to the respective end wall.

7. A pipe coupling as in claim 1 wherein the pipe coupling is an exterior pipe coupling.

8. A pipe coupling as in claim 1 wherein the pipe coupling is an interior pipe coupling.

9. A pipe coupling as in claim 1 wherein the coupling member has an interior surface and the pipe coupling further comprises a sealing plate attached to the inner surface of the coupling member adjacent one of the first and second axial edges and extending outwardly from the one of the first and second axial edges to an axial plate edge for sealing the axial split of the coupling member when the coupling is fitted about the joint and the first and second axial edges are joined.

10. An interior pipe coupling assembly comprising:
   an annular coupling member having an axial split defined by first and second axial edges;
   a pair of spreader plates, one spreader plate extending inwardly from the coupling member along the first axial edge and another of the spreader plates extending inwardly from the coupling member along the second axial edge so that the spreader plates face one another, each of the spreader plates having a socket facing the opposing spreader plate, and
   a spreader bolt assembly for spreading the spreader plates apart and forcing the annular coupling member against the pipe ends comprising:
      a spreader bolt including a head, a ball fixed to and extending from one side of the head, and a threaded rod fixed to and extending from an opposite side of the head, and
      a spreader coupling comprising a sheath having a threaded passage for receiving the threaded rod of the spreader bolt and a ball fixed to and extending from one end of the sheath,
      the spreader bolt assembly being positionable between the spreader plates with the threaded rod threaded into the sheath, the ball of the spreader bolt being pivotally engaged with the socket of the one spreader plate and the ball of the spreader coupling being pivotally engaged with the socket of the other spreader plate so that the spreader plates can be spread apart by turning the spreader bolt relative to the spreader coupling so as to feed the spreader bolt outwardly from the spreader coupling.

11. An interior pipe coupling assembly as in claim 10 wherein the head of the spreader bolt and the sheath of the spreader coupling are polyhedrons.

12. A method for positioning a coupling inside a pipe or pipeline comprising the steps of:
   disposing inside a pipe or pipeline a coupling comprising an annular coupling member having an axial split defined by first and second axial edges and a pair of spreader plates, one spreader plate extending inwardly from the coupling member along the first axial edge and another of the spreader plates extending inwardly from the coupling member along the second axial edge so that the spreader plates face one another, each of the spreader plates having a socket facing the opposing spreader plate, and
   disposing between the spreader plates a spreader bolt assembly for spreading the spreader plates apart and forcing the annular coupling member against the pipe ends comprising:
      a spreader bolt including a head, a ball fixed to and extending from one side of the head, and a threaded rod fixed to and extending from an opposite side of the head, and
      a spreader coupling comprising a sheath having a threaded passage for receiving the threaded rod of the spreader bolt and a ball fixed to and extending from one end of the sheath,
   positioning the spreader bolt assembly between the spreader plates with the threaded rod threaded into the sheath, the ball of the spreader bolt being pivotally engaged with the socket of the one spreader plate and the ball of the spreader coupling being pivotally engaged with the socket of the other spreader plate, and
   feeding the spreader bolt outwardly from the spreader coupling by turning the spreader bolt relative to the spreader coupling so as to spread the spreader plates apart.

* * * * *